(12) United States Patent
Yamashita (10) Patent No.: US 8,576,298 B2
(45) Date of Patent: Nov. 5, 2013

(54) IMAGE PICKUP APPARATUS

(75) Inventor: Tomoya Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 12/129,279

(22) Filed: May 29, 2008

(65) Prior Publication Data

US 2009/0033765 A1 Feb. 5, 2009

(30) Foreign Application Priority Data

Aug. 3, 2007 (JP) ................................. 2007-202796

(51) Int. Cl.
*H04N 5/235* (2006.01)
(52) U.S. Cl.
USPC ...................................... 348/229.1
(58) Field of Classification Search
USPC ................ 348/229.1; 396/234, 161
See application file for complete search history.

(56) References Cited

U.S. PATENT DOCUMENTS

| | | | |
|---|---|---|---|
| 7,450,164 B2 * | 11/2008 | Miyashita | 348/231.99 |
| 7,777,805 B2 * | 8/2010 | Ogami | 348/364 |
| 8,120,692 B2 * | 2/2012 | Yamashita | 348/333.09 |
| 2005/0162541 A1 * | 7/2005 | Ito | 348/345 |
| 2008/0180547 A1 * | 7/2008 | Hirose | 348/229.1 |
| 2009/0033765 A1 * | 2/2009 | Yamashita | 348/229.1 |

FOREIGN PATENT DOCUMENTS

JP 2003-287780 A 10/2003

* cited by examiner

*Primary Examiner* — Aung S Moe
(74) *Attorney, Agent, or Firm* — Canon USA Inc IP Division (57) ABSTRACT

An image pickup apparatus is provided which includes an image pickup device; a display unit configured to perform a control operation to display a signal output from the image pickup device on a monitor; a first photometry section configured to measure luminance of an image of an object based on the signal output from the image pickup device; a second photometry section configured to measure luminance of the image of the object using a photometric sensor mounted at a position different from the image pickup device; and a controller configured to control exposure based on photometric information obtained from the second photometry section in a case where, before photometric information is obtained from the first photometry section, a request is made by a user to capture an image for recording an output of the image pickup device.

17 Claims, 5 Drawing Sheets

IMAGE PICKUP APPARATUS

BACKGROUND OF THE INVENTION

1. Field of the Invention

The present invention relates to exposure control of an image pickup apparatus and to a storage medium storing a program for controlling exposure of an image pickup apparatus.

2. Description of the Related Art

In recent years, image pickup apparatuses such as digital still cameras with the live view function have been available. For example, Japanese Patent Laid-Open No. 2003-287780 discloses an image pickup apparatus with the live-view function employing techniques of controlling exposure, image capturing, and the like.

The foregoing techniques of the related art have the following problems. That is, luminance is measured at least once using an output of an image pickup device before an operation to capture an image for recording begins. Because of the system configuration, it takes at least one frame at minimum to measure luminance using the image pickup device, resulting in a release time lag.

SUMMARY OF THE INVENTION

The present invention provides a technical idea of quickly performing exposure control when an operation to capture an image for recording is performed using an image pickup apparatus.

According to an aspect of the present invention, there is provided an image pickup apparatus including the following elements: an image pickup device; a display unit configured to perform a control operation to display a signal output from the image pickup device on a monitor; a first photometry section configured to measure luminance of an image of an object based on the signal output from the image pickup device; a second photometry section configured to measure luminance of the image of the object using a photometric sensor mounted at a position different from the image pickup device; and a controller configured to control exposure based on photometric information obtained from the second photometry section in a case where, before photometric information is obtained from the first photometry section, a request is made by a user to capture an image for recording an output of the image pickup device.

Further features of the present invention will become apparent from the following description of exemplary embodiments with reference to the attached drawings.

DESCRIPTION OF THE EMBODIMENTS

Various exemplary embodiments, features and aspects of the present invention are now herein described below.

First Exemplary Embodiment

Figure 1:
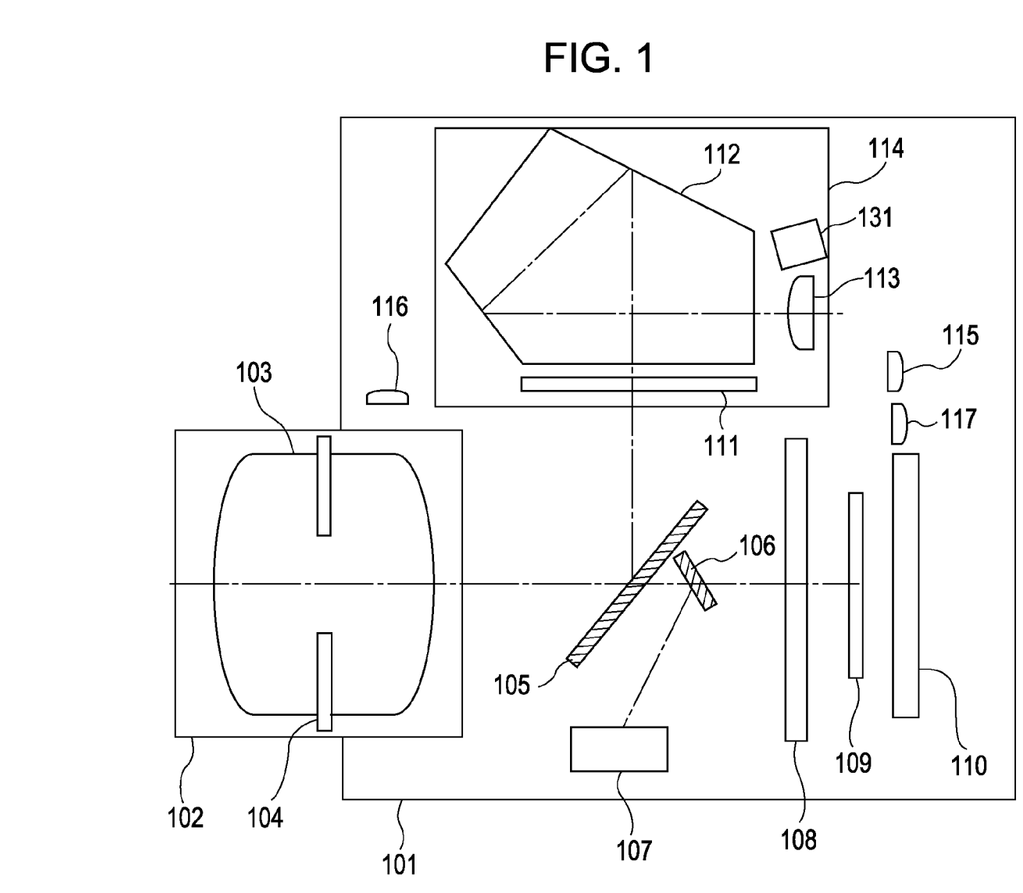
FIG. 1 is a diagram of an example optical arrangement of a digital single-lens reflex camera according to an embodiment of the present invention.

FIG. 1 illustrates an example optical arrangement of an image pickup apparatus, more specifically, a digital single-lens reflex camera, according to an exemplary embodiment of the present invention. The digital single-lens reflex camera includes a camera body 101 and an image pickup lens unit 102 that can be attached to and detached from the camera body 101. The camera body 101 includes an image pickup device 109. An image-forming optical system 103 is provided in the interior of the image pickup lens unit 102 and forms an image of an object on the image pickup device 109 or the like. An aperture mechanism 104 is provided in the interior of the image pickup lens unit 102 and performs exposure control by changing an aperture size. The camera body 101 further includes a focus detector 107; a main mirror 105 that separates an optical path from the image-forming optical system 103 toward an optical viewfinder side and that is implemented by a movable half-mirror; a movable sub-mirror 106 that is provided behind the main mirror 105 and that polarizes, among light beams that have passed through the main mirror 105, light beams near the optical axis to the focus detector 107; and a shutter mechanism 108 that causes, when capturing a still or moving image or displaying an image on a monitor, the main mirror 105 and the sub-mirror 106 to be evacuated to an upper position so that the shutter mechanism 108 can be opened and a light beam from the image pickup lens unit 102 is directly directed to the image pickup device 109.

Figure 2:
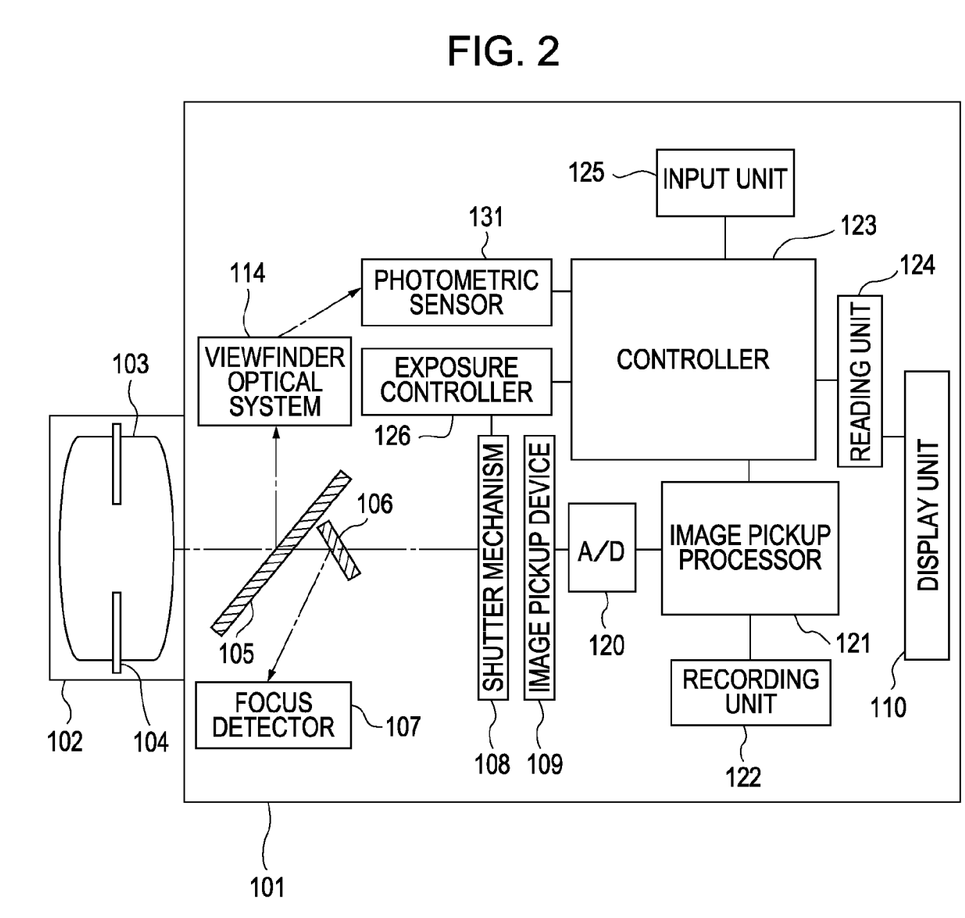
FIG. 2 is a block diagram of an example electrical architecture of the digital single-lens reflex camera shown in FIG. 1 in the case where light is directed to a photometric sensor.

The camera body 101 further includes a display unit 110 that is typically implemented by a liquid crystal monitor or an organic electroluminescent (EL) monitor and that can display an image based on an output from the image pickup device 109 under control of a controller 123 (see FIG. 2). In this example, the display unit 110 is integrated with the camera body 101. Alternatively, the display unit 110 may be rotatable at multiple angles. Alternatively, an external monitor may display an image based on an output from the image pickup device 109.

The camera body 101 further includes a focusing screen 111 provided on a surface on which an image of an object is formed; a pentaprism 112; and an eyepiece 113 for observing an optical viewfinder image. The focusing screen 111, the pentaprism 112, and the eyepiece 113 are included in a viewfinder optical system 114. The viewfinder optical system 114 further contains a photometric sensor 131. The digital single-lens reflex camera further includes a main switch 115, a release switch 116 that gives an instruction to start capturing an image, and a viewfinder-mode selecting switch 117 that switches the viewfinder mode between a live view mode (mode in which an image of an object can be viewed using the display unit 110) and a non-live view mode (mode in which an image of an object can be viewed using an optical viewfinder). The viewfinder-mode selecting switch 117 gives instructions to start and terminate the live view mode.

FIG. 2 illustrates an example electrical architecture of the digital single-lens reflex camera with the foregoing structure. The digital single-lens reflex camera includes the camera body 101, the image pickup lens unit 102, the image-forming optical system 103 provided in the interior of the image pickup lens unit 102, the aperture mechanism 104, the main mirror 105, the sub-mirror 106, the focus detector 107, the shutter mechanism 108, and the image pickup device 109.

The digital single-lens reflex camera further includes an audio-to-digital (A/D) converter 120 that converts an analog image signal from the image pickup device 109 to a digital image pickup signal; an image pickup processor 121 that performs, based on the digital image signal from the A/D converter 120, various correction of image information, conversion of red (R), green (G), and blue (B) signals into luminance (Y) and chrominance (C) signals, white balance processing, gamma correction processing, and signal interpolation processing; a recording unit 122 that records image information obtained by the image pickup processor 121; a controller 123 that performs various control operations of the camera; a reading unit 124 that reads the image information recorded by the recording unit 122 so as to be displayable on the display unit 110; an input unit 125 including the main switch 115 (see FIG. 1), the release switch 116 (see FIG. 1), the viewfinder-mode selecting switch 117 (see FIG. 1), and the like; an exposure controller 126 that controls exposure by controlling the aperture mechanism 104 and the shutter mechanism 108; and the photometric sensor 131, which is actually provided in the interior of the viewfinder optical system 114, as shown in FIG. 1.

The foregoing image pickup apparatus has the function of obtaining photometric information from image data obtained by the image pickup device 109 and obtaining photometric information from an output of the photometric sensor 131. In the live view mode, photometric information obtained from image data obtained by the image pickup device 109 is mainly used. In the non-live view mode, photometric information obtained from an output of the photometric sensor 131 is mainly used. This is because of the following reasons. That is, when the main mirror 105 is rotated (see FIG. 3 described below) and light reflected from an object is radiated to the image pickup device 109, the photometric sensor 131 is shielded from the light reflected from the object.

Figure 3:
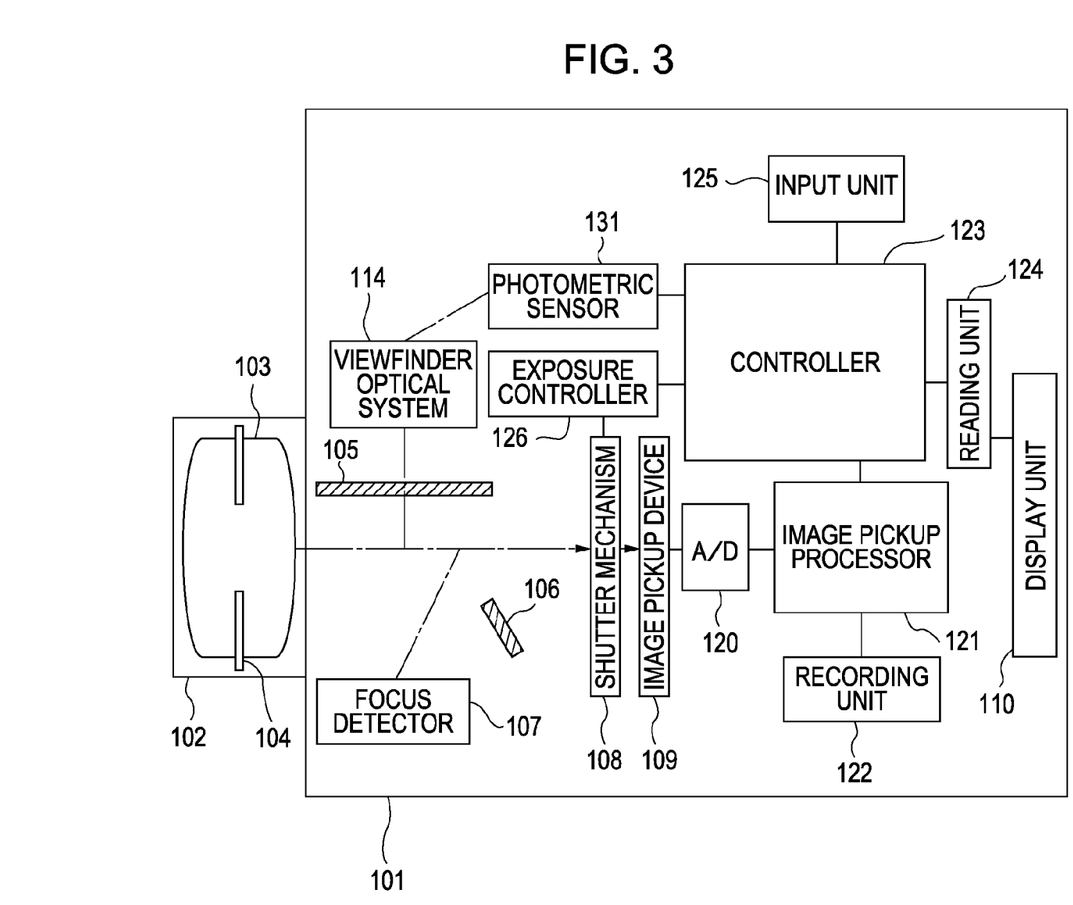
FIG. 3 is a block diagram of the electrical architecture of the digital single-lens reflex camera shown in FIG. 1 in the case where light is directed to an image pickup device.

FIG. 3 illustrates the electrical architecture of the digital single-lens reflex camera with the foregoing structure. In FIG. 2, the main mirror 105 is rotated, and light reflected from an object is not radiated to the image pickup device 109. In contrast, in FIG. 3, the main mirror 105 is rotated, and light reflected from an object is radiated to the image pickup device 109.

Figures 4, 4A:
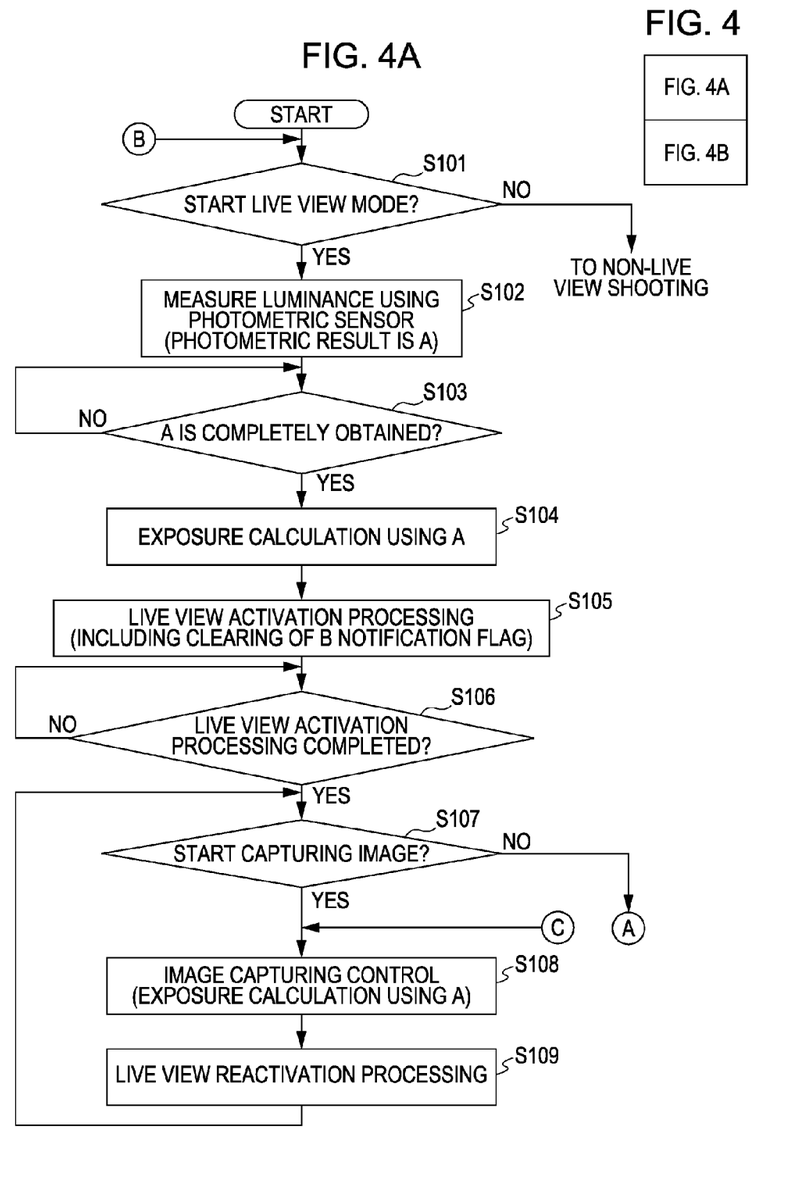
FIGS. 4A and 4B constitute a flowchart of an example operation at the time an operation to start a live view mode is performed and at the time an operation to start capturing an image using the digital single-lens reflex camera shown in FIG. 1 is performed.
Figure 4B:
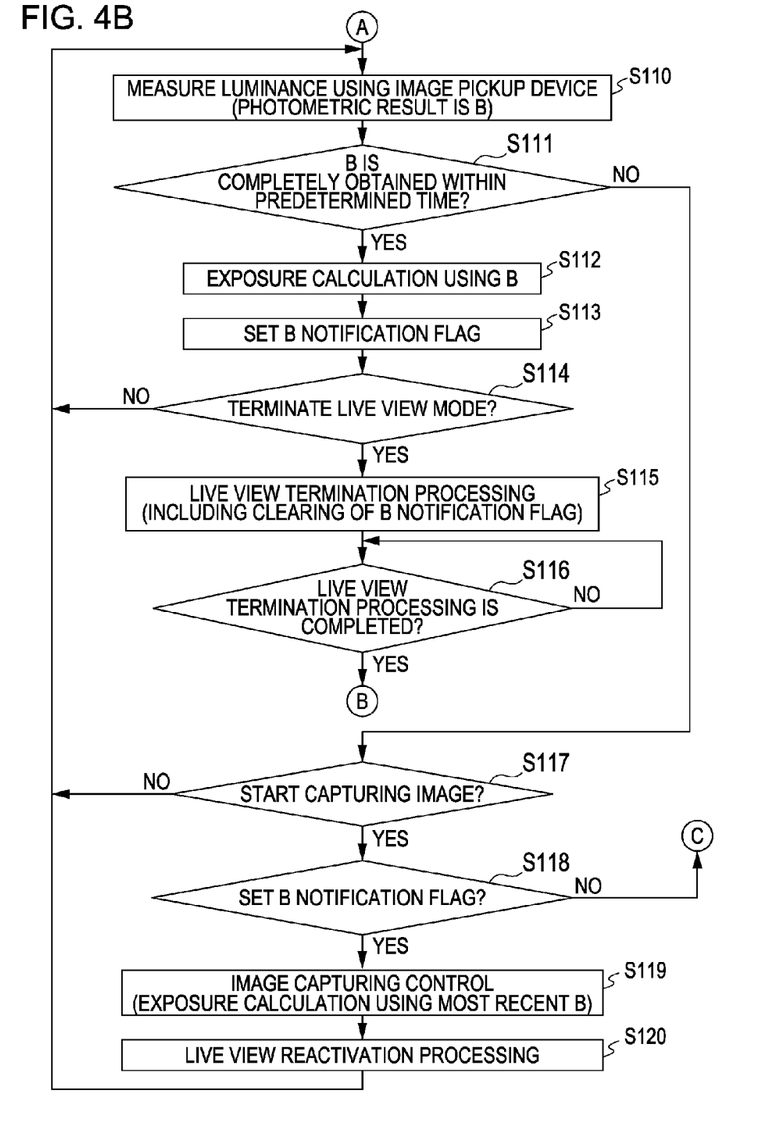

The flowchart shown in FIGS. 4A and 4B describes an example operation of the camera with the foregoing structure in the case where an operation to start the live view mode according to the embodiment of the present invention is performed and then an operation to start capturing an image is performed. An operation to start capturing an image corresponds to an operation to give an instruction to capture an image for recording a signal output from the image pickup device 109.

In step S101, it is determined whether the viewfinder-mode selecting switch 117 is pressed to give an instruction to start the live view mode. When no instruction is given to start the live view mode, a camera operation in the non-live view mode is performed, a description of which is herein omitted.

When an instruction to start the live view mode is given in step S101 described above, the flow proceeds to step S102, and a photometric measurement operation begins using an output of the photometric sensor 131, which is different from the image pickup device 109. This is because of the following reasons. When the main mirror 105 is rotated (FIG. 3) and light reflected from an object is radiated to the image pickup device 109, the photometric sensor 131 is shielded from the light reflected from the object. When the main mirror 105 is rotated (FIG. 2) and light reflected from an object is radiated to the photometric sensor 131, the image pickup device 109 is shielded from the light reflected from the object.

In step S103, it is determined whether the photometric measurement operation is completed. A photometric result obtained using the photometric sensor 131 is denoted by A, which will be used in the following description. After the obtaining of the photometric result A is completed, the flow proceeds from step S103 to step S104, and an exposure calculation using the photometric result A is performed. Accordingly, information such as a Tv value and an Av value for capturing an image, an exposure correction value, and an International Organization for Standardization (ISO) speed rating are established according to each photographing mode. Using the established Tv value, Av value, and exposure correction value, a shutter and an aperture are set, and light reflected from an object is radiated to the image pickup device 109. Using the established ISO speed rating, a signal output from the image pickup device 109 is processed.

In step S105, the following processing is performed to enable the camera to be controllable in the live view mode: mirror up processing, shutter opening processing, image-pickup-device driving starting processing, display updating processing, and preset-value changing processing. In step S106, it is determined whether the live view mode activation processing is completed. When the live view mode activation processing is completed, an image is displayed on the display unit 110 in the live view mode. In step S107, it is determined whether an instruction to start capturing an image in the live view mode is given by operating the release switch 116. This determination is made to determine whether or not a request is made by a user to capture an image for recording an output of the image pickup device 109. When an instruction is given to start capturing an image in the live view mode, the flow proceeds to step S108.

In step S108, image capturing control begins using the photometric result A obtained in step S102 and the exposure calculation result obtained in step S104 based on the photometric result A. Using the shutter and the aperture that have been set based on the Tv value, the Av value, and the exposure correction value calculated in step S104, light reflected from an object is radiated to the image pickup device 109. Using the ISO speed rating calculated in step S104, a signal output from the image pickup device 109 is processed.

Thereafter, after the image capturing control is completed, the flow proceeds to step S109, and the live view mode, which has been temporarily interrupted due to the image capturing operation, is resumed. The live view mode has been interrupted since the light has been blocked by the shutter mechanism 108 in order to read a signal from the image pickup device 109.

In order to end the interrupted state and to enable the camera to be controllable in the live view mode again, live view mode reactivation processing including shutter opening processing and display updating processing is performed.

When the live view mode reactivation processing is completed, the process returns to step S107, and it is again determined whether an instruction to start capturing an image in the live view mode is given by operating the release switch 116. This determination is made to determine whether or not a request is made by the user to capture an image for recording an output from the image pickup device 109.

When an instruction is given again to start capturing an image in the live view mode, the flow proceeds to step S108, and, as in the above description, image capturing control begins using the photometric result A and the exposure calculation result obtained based on the photometric result A.

That is, using the shutter and the aperture that have been set based on the Tv value, the Av value, and the exposure correction value calculated, light reflected from an object is radiated to the image pickup device 109. Using the ISO speed rating calculated, a signal output from the image pickup device 109 is processed.

When the image capturing control is completed, the flow proceeds to step S109, and live view mode reactivation processing is performed. The live view mode reactivation processing is performed to enable the camera to be controllable in the live view mode again and includes mirror up processing, shutter opening processing, image-pickup-device driving starting processing, display updating processing, and preset-value changing processing.

After the live view mode reactivation processing is completed or when the determination in step S107 after the live view mode reactivation is completed indicates that no instruction has been given to start capturing an image in the live view mode, the flow proceeds to step S110, and a photometric measurement operation begins using the image pickup device 109. A photometric result obtained using the image pickup device 109 is denoted by B, which will be used in the following description. In step S111, it is determined whether the obtaining of the photometric result B is completed within a predetermined time. When the photometric result B is obtained within the predetermined time, the flow proceeds to step S112, and an exposure calculation using the photometric result B, which is obtained from image data provided by the image pickup device 109, is performed. Accordingly, information such as a Tv value and an Av value for capturing an image, an exposure correction value, and an ISO speed rating are established according to each photographing mode. Using the established Tv value, Av value, and exposure correction value, the shutter and the aperture are set, and light reflected from an object is radiated to the image pickup device 109. Using the established ISO speed rating, a signal output from the image pickup device 109 is processed.

When the photometric measurement operation is completed, in step S113, a B notification flag indicating that the photometric measurement operation using the image pickup device 109 is completed is set. The B notification flag is cleared when the live view mode activation processing is performed (S105) or when the live view mode termination processing (S115), which is described later, is performed.

In step S114, it is determined whether an instruction to terminate the live view mode is given by operating the viewfinder-mode selecting switch 117.

When the determination result shows that no instruction is given to terminate the live view mode, the flow returns to step S110 in which a photometric measurement operation is started again using image data provided from the image pickup device 109. When an instruction to terminate the live view mode is given, the flow proceeds to step S115.

The following live view mode termination processing is performed to enable the camera to be controllable in the non-live view mode: mirror down processing, shutter closing processing, image-pickup-device driving stopping processing, display updating processing, and preset-value changing processing. In step S116, it is determined whether the live view mode termination processing is completed. When the live view mode termination processing is completed, the flow returns to step S101, and it is again determined whether an instruction to start the live view mode is given by operating the viewfinder-mode selecting switch 117.

When the photometric result B is not obtained within the predetermined time in step S111, the flow proceeds to step S117, and it is determined whether an instruction to start capturing an image in the live view mode is given by operating the release switch 116. This determination is made to determine whether or not a request is made by the user to capture an image for recording an output of the image pickup device 109. When no instruction is given to start capturing an image in the live view mode, the flow returns to step S110, and a similar operation is repeated.

In contrast, when an instruction is given to start capturing an image in the live view mode, the flow proceeds from step S117 to step S118, and it is determined whether the B notification flag has been set. This is to determine whether or not at least one photometric measurement operation is completed using the image pickup device 109 since the live view mode has begun. When the determination result shows that the B notification flag has been set, the flow proceeds to step S119, and image capturing control begins using the most recent photometric result B and the exposure calculation result obtained based on the most recent photometric result B. When the image capturing control is completed, the flow proceeds to step S120, and the live view mode, which has been temporarily interrupted due to the image capturing operation, is resumed. That is, in order to enable the camera to be controllable in the live view mode again, live view mode reactivation processing including shutter opening processing and display updating processing is performed. When the live view mode reactivation processing is completed, the flow returns to step S110, and a photometric measurement operation begins using the image pickup device 109.

When it is determined in step S118 that no B notification flag has been set, the flow returns to step S108, and image capturing control begins using the photometric result A and the exposure calculation result obtained based on the photometric result A. When the image capturing control is completed, the flow proceeds to step S109, and the live view mode reactivation processing begins, as has been described above. Thereafter, the flow returns to step S107, and it is determined whether an instruction is given to start capturing an image in the live view mode again. When no instruction is given to start capturing an image, as has been described above, the processing from step S110 onward is performed in which a photometric measurement operation begins using the image pickup device 109. After the B notification flag has been set, when an instruction to start capturing an image is given, the flow proceeds from step S111 to step S117, to S118, and to S119, and image capturing control is performed.

The foregoing operation is repeated to perform an exposure calculation and image capturing control in the live view mode.

According to the foregoing embodiment, when an image capturing operation begins immediately after the live view mode has started or restarted, information up to that point is taken into consideration. That is, instead of waiting in all cases for a photometric result obtained using the image pickup device 109, the photometric result B obtained using the image pickup device 109 (S112) or the photometric result A obtained using the dedicated photometric sensor 131 (S104) is appropriately used.

More specifically, when an operation is entered to start the live view mode, the photometric result A is obtained from an output of the photometric sensor 131 (S102). Using the photometric result A, the live view mode is started (S105). Thereafter, as the photometric result B for allowing the live view mode to continue, the photometric result B is obtained from an output of the image pickup device 109 (S110). However, when a request to start capturing an image is made before the obtaining of the photometric result B is completed (no in step S111 and yes in step S117), an image capturing operation begins based on the photometric result A, instead of waiting for the photometric result B to be obtained (no in step S118 and the flow proceeds to S108).

Due to an image capturing operation in response to a request to start capturing an image, the live view mode has been temporarily interrupted. After the image capturing operation is completed, it is assumed that the live view mode is resumed (the flow proceeds from S109 to S120). In this case, when a request to start capturing an image is made before the obtaining of the first photometric result B is completed after the live view mode has been resumed (the flow proceeds from S110 to S111 where the determination is no, and the flow proceeds to S117 where the determination is yes), the flow does not wait for the photometric result B to be obtained. An image capturing operation begins based on the most recent photometric result B, which has been obtained in the immediately preceding image capturing operation (yes in S118, and the flow proceeds to S119).

Accordingly, a highly responsive image capturing operation can be performed. That is, it is possible to provide an image pickup apparatus that can start an image capturing operation without a release time lag when the live view mode is started or restarted.

In the foregoing embodiment, the mode is switched between two modes using the main mirror 105. In one mode, light reflected from an object is directed to the photometric sensor 131. In the other mode, light reflected from an object is directed to the image pickup device 109. Even when no such switching member as the main mirror 105 is provided, this mode switching function is applicable to the case in which exposure control is switched between the case based on an output of the photometric sensor 131 and the case based on an output of the image pickup device 109. Even when no such mechanical change as the rotation of the main mirror 105 is present, not a little time lag occurs.

The present embodiment of the invention can be achieved by providing a storage medium storing program code of software for realizing the operation shown in FIG. 3 to a system or an apparatus. That is, the present embodiment of the invention can be achieved by reading and executing the program code stored in the storage medium by using a computer (central processing unit (CPU) or a microprocessing unit (MPU)) of the system or the apparatus. In this case, the program code read from the storage medium realizes functions of the embodiment, and the storage medium storing the program code constitutes an embodiment of the present invention.

Storage media for providing the program code include, for example, a flexible disk, a hard disk, an optical disk, a magneto-optical disk, a compact-disc read-only memory (CD-ROM), a CD-recordable (CD-R), a magnetic tape, a non-volatile semiconductor memory card, and a ROM. In some cases, functions of the foregoing embodiment are achieved by executing the program code that has been read using a computer.

Further, the functions of the foregoing embodiment may be implemented by an operating system (OS) or the like running on a computer executing part or entire actual processing in accordance with instructions of the program code.

Further, in some cases, the program code read from the storage medium is written into a memory included in a function expansion board or unit provided in or connected to a computer. Thereafter, the functions of the foregoing embodiment may be implemented by a CPU included in the function expansion board or unit executing part or entire actual processing in accordance with instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-202796 filed Aug. 3, 2007, which is hereby incorporated by reference herein in its entirety.

What is claimed is:

1. An image pickup apparatus comprising:
   an image pickup device;
   a display unit mounted in the image pickup apparatus to perform a control operation to display a signal output from the image pickup device on a monitor;
   a first photometry section mounted in the image pickup apparatus to measure luminance of an image of an object based on the signal output from the image pickup device, wherein the first photometry section measures luminance in a case where a mirror member is evacuated to an upper position so that a light beam from an image pickup lens unit is directed to the image pickup device;
   a second photometry section mounted in the image pickup apparatus to measure luminance of the image of the object using a photometric sensor, wherein the second photometry section measures luminance in a case where the mirror member is located in a lower position, wherein the photometric sensor is arranged in another position with the image pickup device for the mirror; and
   a controller mounted in the image pickup apparatus to control exposure based on luminance measured by the second photometry section in a case where, after a shift from a second mode to a first mode is started and before luminance is measured by the first photometry section, a request is made by a user to capture an image for recording an output of the image pickup device,
   wherein the first mode is a mode in which the first photometry section measures luminance and the monitor displays a signal output from the image pickup device, wherein the second mode is a mode in which the second photometry section measures luminance.

2. The image pickup apparatus according to claim 1, wherein exposure is controlled based on luminance measured by the first photometry section in a case where, after luminance is measured by the first photometry section, a request is made by the user to capture an image for recording an output of the image pickup device.

3. The image pickup apparatus according to claim 1, wherein the second photometry section is shielded from light reflected from the object in a case where the light reflected from the object is radiated to the image pickup device, and the image pickup device is shielded from the light reflected from the object in a case where the light reflected from the object is radiated to the second photometry section.

4. The image pickup apparatus according to claim 1, wherein the controller begins an image capturing operation based on luminance measured by the first photometry section, which has been obtained before reactivation of a live view mode, in a case where a request is made by the user to capture an image for recording an output of the image pickup device before luminance is measured by the first photometry section after the reactivation of the live view mode.

5. The image pickup apparatus according to claim 1, wherein an aperture value is calculated from luminance information when an instruction is performed to display imaging data on the display.

6. A method for controlling an image pickup apparatus including an image pickup device, a display unit configured to perform a control operation to display a signal output from the image pickup device on a monitor, a first photometry section configured to measure luminance of an image of an object based on the signal output from the image pickup device, and a second photometry section configured to measure luminance of the image of the object using a photometric sensor mounted, the method comprising:

controlling exposure based on luminance measured by the second photometry section in a case where, after a shift from a second mode to a first mode is started and before luminance is measured by the first photometry section, a request is made by a user to capture an image for recording an output of the image pickup device; and     controlling exposure based on luminance measured by the first photometry section in a case where, after luminance is measured by the first photometry section, a request is made by the user to capture an image for recording an output of the image pickup device,     wherein the first photometry section measures luminance in a case where a mirror member is evacuated to an upper position so that a light beam from an image pickup lens unit is directed to the image pickup device,     wherein the second photometry section measures luminance in a case where the mirror member is located in a lower position,     wherein the photometric sensor is arranged in another position with the image pickup device for the mirror,     wherein the first mode is a mode in which the first photometry section measures luminance and the monitor displays a signal output from the image pickup device,     wherein the second mode is a mode in which the second photometry section measures luminance.

7. A non-transitory computer readable medium containing computer-executable instructions for controlling an image pickup apparatus including an image pickup device, a display unit configured to perform a control operation to display a signal output from the image pickup device on a monitor, a first photometry section configured to measure luminance of an image of an object based on the signal output from the image pickup device, and a second photometry section configured to measure luminance of the image of the object using a photometric sensor mounted, the computer readable medium comprising:

computer-executable instructions that control exposure based on luminance measured by the second photometry section in a case where, after a shift from a second mode to a first mode is started and before luminance is measured by the first photometry section, a request is made by a user to capture an image for recording an output of the image pickup device; and     computer-executable instructions that control exposure based on luminance measured by the first photometry section in a case where, after luminance is measured by the first photometry section, a request is made by the user to capture an image for recording an output of the image pickup device,     wherein the first photometry section measures luminance in a case where a mirror member is evacuated to an upper position so that a light beam from an image pickup lens unit is directed to the image pickup device,     wherein the second photometry section measures luminance in a case where the mirror member is located in a lower position,     wherein the photometric sensor is arranged in another position with the image pickup device for the mirror,     wherein the first mode is a mode in which the first photometry section measures luminance and the monitor displays a signal output from the image pickup device,     wherein the second mode is a mode in which the second photometry section measures luminance.

8. An image pickup apparatus comprising:

an image pickup device;

a first photometry section mounted in the image pickup apparatus to measure luminance of an image of an object based on the signal output from the image pickup device, wherein the first photometry section measures luminance in a case where a mirror member is evacuated to an upper position so that a light beam from an image pickup lens unit is directed to the image pickup device;

a second photometry section mounted in the image pickup apparatus to measure luminance of the image of the object using a photometric sensor, wherein the second photometry section measures luminance in a case where the mirror member is located in a lower position, wherein the photometric sensor is arranged in another position with the image pickup device for the mirror; and     a controller mounted in the image pickup apparatus to control exposure based on luminance measured by the second photometry section in a case where, after a shift from a second mode to a first mode is started and before luminance is measured by the first photometry section, a request to capture an image for recording an output of the image pickup device is made,     wherein the first mode is a mode in which the mirror member is located in the upper position, wherein the second mode is a mode in which the mirror member is located in the lower position.

9. The image pickup apparatus according to claim 8, wherein exposure is controlled based on luminance measured by the first photometry section in a case where, after luminance is measured by the first photometry section, a request to capture an image for recording an output of the image pickup device is made.

10. The image pickup apparatus according to claim 8, wherein the second photometry section is shielded from light reflected from the object in a case where the light reflected from the object is radiated to the image pickup device, and the image pickup device is shielded from the light reflected from the object in a case where the light reflected from the object is radiated to the second photometry section.

11. The image pickup apparatus according to claim 8, wherein the controller begins an image capturing operation based on luminance measured by the first photometry section, which has been obtained before reactivation of a live view mode, in a case where a request to capture an image for recording an output of the image pickup device is made before luminance is measured by the first photometry section after the reactivation of the live view mode.

12. The image pickup apparatus according to claim 8, wherein an aperture value is calculated from luminance information when an instruction is performed to display imaging data on a display.

13. An image pickup apparatus comprising:

an image pickup device;

a first photometry section mounted in the image pickup apparatus to measure luminance of an image of an object based on the signal output from the image pickup device, wherein the first photometry section measures luminance in a live view mode for displaying a signal output from the image pickup device;

a second photometry section mounted in the image pickup apparatus to measure luminance of the image of the object using a photometric sensor, wherein the second photometry section measures luminance in an OVF mode for observing an optical viewfinder image; and a controller mounted in the image pickup apparatus to control exposure based on luminance measured by the second photometry section in a case where, after a shift from the OVF mode to the live view mode is started and before luminance is measured by the first photometry section, a request to capture an image for recording an output of the image pickup device is made.

14. The image pickup apparatus according to claim 13, wherein exposure is controlled based on luminance measured by the first photometry section in a case where, after luminance is measured by the first photometry section, the request is made.

15. The image pickup apparatus according to claim 13, wherein the second photometry section is shielded from light reflected from the object in a case where the light reflected from the object is radiated to the image pickup device, and the image pickup device is shielded from the light reflected from the object in a case where the light reflected from the object is radiated to the second photometry section.

16. The image pickup apparatus according to claim 13, wherein the controller begins an image capturing operation based on luminance measured by the first photometry section, which has been obtained before reactivation of the live view mode, in a case where a request to capture an image for recording an output of the image pickup device is made before luminance is measured by the first photometry section after the reactivation of the live view mode.

17. The image pickup apparatus according to claim 13, wherein an aperture value is calculated from luminance information when an instruction is performed to display imaging data on a display.

* * * * *